United States Patent
Bhattad et al.

(10) Patent No.: US 8,670,774 B2
(45) Date of Patent: Mar. 11, 2014

(54) SYSTEMS AND METHODS FOR UPLINK CONTROL RESOURCE ALLOCATION

(75) Inventors: Kapil Bhattad, San Diego, CA (US); Juan Montojo, San Diego, CA (US); Ravi Palanki, San Diego, CA (US); Amir Farajidana, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 715 days.

(21) Appl. No.: 12/560,624

(22) Filed: Sep. 16, 2009

(65) Prior Publication Data

US 2010/0075686 A1   Mar. 25, 2010

Related U.S. Application Data

(60) Provisional application No. 61/098,377, filed on Sep. 19, 2008, provisional application No. 61/108,806, filed on Oct. 27, 2008.

(51) Int. Cl.
*H04W 72/00* (2009.01)

(52) U.S. Cl.
USPC ........ 455/450; 455/422.1; 370/320; 370/328; 370/464

(58) Field of Classification Search
USPC ............ 455/450–455, 422.1, 464, 509, 26.1, 455/410, 411, 418–420, 414.1–414.3, 455/456.3; 370/276–306, 431–463, 370/328–350, 310–310.2; 725/62; 705/14.64
See application file for complete search history.

(56) References Cited

U.S. PATENT DOCUMENTS

| | | | | |
|---|---|---|---|---|
| 5,943,361 | A * | 8/1999 | Gilhousen et al. | 375/142 |
| 2002/0071412 | A1 * | 6/2002 | Masui et al. | 370/335 |
| 2002/0126637 | A1 * | 9/2002 | Refai et al. | 370/331 |
| 2007/0171864 | A1 * | 7/2007 | Zhang et al. | 370/329 |
| 2008/0090528 | A1 | 4/2008 | Malladi | |
| 2008/0318587 | A1 * | 12/2008 | Barrett | 455/452.1 |
| 2009/0067534 | A1 * | 3/2009 | Kwak et al. | 375/267 |

FOREIGN PATENT DOCUMENTS

| | | |
|---|---|---|
| WO | WO2007084482 A2 | 7/2007 |
| WO | 2008105422 A1 | 9/2008 |

OTHER PUBLICATIONS

International Search Report and Written Opinion—PCT/US2009/057361—ISA/EPO—Jan. 29, 2010.
Motorola: "E-UTRA Uplink Control Channel Design and TP" Internet Citation, [Online] XP002474357 Retrieved from the Internet: URL: http://www.3gpp.org/ftp/tsg-ran/WG1-RL1/TSGR1_44/Docs/R1-060403.zip> [retrieved on Mar. 28, 2008].

(Continued)

Primary Examiner — Ronald Eisner
(74) Attorney, Agent, or Firm — Liem T. Do

(57) ABSTRACT

Systems and methods of uniquely identifying communication nodes in a wireless communication system are described herein. One embodiment of the disclosure provides a wireless communication apparatus operative in a communication network. The apparatus comprises a transceiver configured to transmit control information over a first frequency range and content data over a second frequency range during a first predetermined time interval. The first frequency range is allocated to carry a first plurality of control blocks for transmitting only the control information. A duration of each of the first plurality of control blocks spans over the entire duration of the first predetermined time interval. The apparatus further comprises a processing circuit configured to direct the control information of the transceiver over the second frequency range for transmission to a base station node.

52 Claims, 9 Drawing Sheets

(56) References Cited

OTHER PUBLICATIONS

Qualcomm Europe,Clarifying PUSCH resource allocation,R1-083181,3GPP,Aug. 18, 2008.

TS 36.211,3GPP,Sep. 16, 2008,pp. 16,URL,http://www.3gpp.org/ftp/Specs/archive/36_series/36.211/36211-840.zip.

* cited by examiner

SYSTEMS AND METHODS FOR UPLINK CONTROL RESOURCE ALLOCATION

CROSS REFERENCE TO RELATED APPLICATION(S)

This application claims the benefit of U.S. Provisional Application No. 61/098,377, filed Sep. 19, 2008, and U.S. Provisional Application No. 61/108,806, filed Oct. 27, 2008 the entire content of each of which is incorporated herein by reference.

BACKGROUND

1. Field of the Invention

The present application relates generally to wireless communications, and more specifically to systems and methods to allocate uplink control resources for Long Term Evolution (LTE) systems.

2. Relevant Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance. To support the enhanced performance new systems and methods for uplink control resource allocation are needed.

SUMMARY OF THE INVENTION

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Description of the Preferred Embodiments" one will understand how the features of this invention provide advantages that include supporting increased payload in uplink control channels than currently supported.

One embodiment of the disclosure provides a wireless communication apparatus operative in a communication network. The apparatus comprises a transceiver configured to transmit control information over a first frequency range and content data over a second frequency range during a first predetermined time interval. The first frequency range is allocated to carry a first plurality of control blocks for transmitting only the control information. A duration of each of the first plurality of control blocks spans over the entire duration of the first predetermined time interval. The apparatus further comprises a processing circuit configured to direct the control information of the transceiver over the second frequency range for transmission to a base station node.

Another embodiment of the disclosure provides a wireless communication apparatus operative in a communication network. The apparatus comprises a processing circuit configured to schedule transmission of control information over a first frequency range and content data over a second frequency range during a first predetermined time interval. The first frequency range is allocated to carry a first plurality of control blocks for transmitting only the control information. A duration of each of the first plurality of control blocks spans over the entire duration of the first predetermined time interval. The apparatus further comprises a transceiver. The transceiver is configured to send a schedule of the scheduled transmission to a first communication device. The schedule directs transmission of the control information of the first communication device over the second frequency range.

Yet another embodiment of the disclosure provides a method of communicating between an access terminal and a base station node. The method comprises identifying a first frequency range for transmission of control information and a second frequency range for transmission of content data during a first predetermined time interval. The first frequency range is allocated to carry a first plurality of control blocks for transmitting only the control information. A duration of each of the first plurality of control blocks spans over the entire duration of the first predetermined time interval. The method further comprises transmitting the control information of the access terminal over the second frequency range to the base station node.

A further embodiment of the disclosure provides a method of communicating between an access terminal and a base station node. The method comprises scheduling transmission of control information of the access terminal over a first frequency range and content data over a second frequency range during a first predetermined time interval. The first frequency range is allocated to carry a first plurality of control blocks for transmitting only the control information. A duration of each of the first plurality of control blocks spans over the entire duration of the first predetermined time interval. The method further comprises transmitting a schedule of the scheduled transmission to the access terminal. The schedule directs transmission of the control information of the access terminal over the second frequency range.

Yet a further embodiment of the disclosure provides a wireless communication apparatus operative in a communication network. The apparatus comprises means for transmitting control information over a first frequency range and content data over a second frequency range during a first predetermined time interval. The first frequency range is allocated to carry a first plurality of control blocks for transmitting only the control information. A duration of each of the first plurality of control blocks spans over the entire duration of the first predetermined time interval. The apparatus further comprises means for directing the control information of the transmitting means over the second frequency range for transmission to a base station node.

Another embodiment of the disclosure provides a wireless communication apparatus operative in a communication network. The apparatus comprises means for scheduling transmission of control information over a first frequency range and content data over a second frequency range during a first predetermined time interval. The first frequency range is allocated to carry a first plurality of control blocks for transmitting only the control information. A duration of each of the first plurality of control blocks spans over the entire duration of the first predetermined time interval. The apparatus further comprises means for transmitting a schedule of the scheduled transmission to a first communication device. The schedule directs transmission of the control information of the first communication device over the second frequency range.

Yet another embodiment of the disclosure provides a computer program product, comprising computer-readable medium. The computer-readable medium comprises code for causing a computer to identify a first frequency range for transmission of control information and a second frequency range for transmission of content data during a first predetermined time interval. The first frequency range is allocated to carry a first plurality of control blocks for transmitting only the control information. A duration of each of the first plurality of control blocks spans over the entire duration of the first predetermined time interval. The computer-readable medium further comprises code for causing a computer to transmit the control information of an access terminal over the second frequency range to a base station node.

A further embodiment of the disclosure provides a computer program product, comprising computer-readable medium. The computer-readable medium comprises code for causing a computer to schedule transmission of control information of an access terminal over a first frequency range and content data over a second frequency range during a first predetermined time interval. The first frequency range is allocated to carry a first plurality of control blocks for transmitting only the control information. A duration of each of the first plurality of control blocks spans over the entire duration of the first predetermined time interval. The computer-readable medium further comprises code for causing a computer to transmit a schedule of the scheduled transmission to the access terminal. The schedule directs transmission of the control information of the access terminal over the second frequency range.

DESCRIPTION OF THE PREFERRED EMBODIMENTS

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
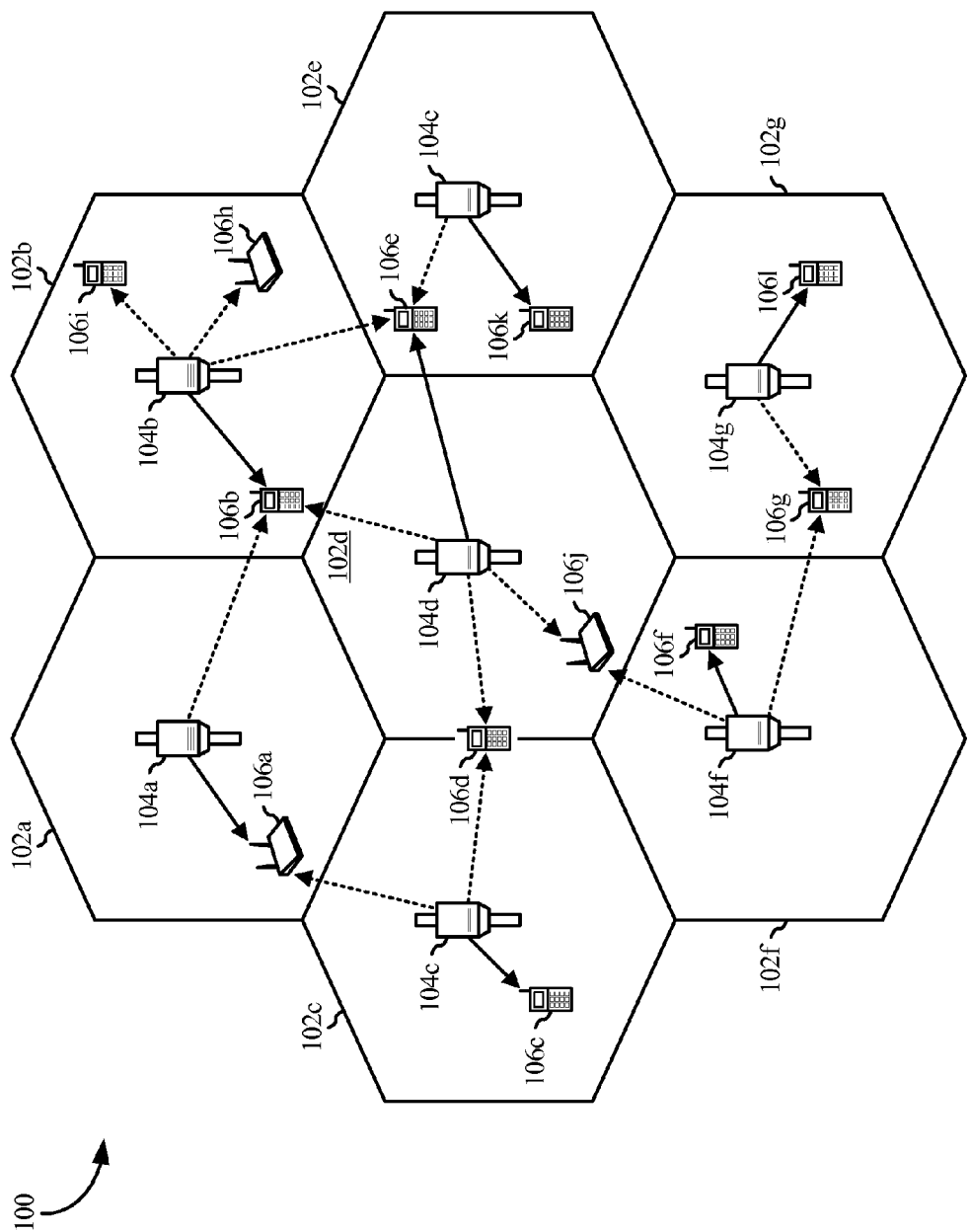
FIG. 1 illustrates an exemplary wireless communication network.

FIG. 1 illustrates an exemplary wireless communication network 100. The wireless communication network 100 is configured to support communication between a number of users. The wireless communication network 100 may be divided into one or more cells 102, such as, for example, cells 102a-102g. Communication coverage in cells 102a-102g may be provided by one or more nodes 104 (e.g., base stations), such as, for example, nodes 104a-104g. Each node 104 may provide communication coverage to a corresponding cell 102. The nodes 104 may interact with a plurality of access terminals (ATs), such as, for example, ATs 106a-106l.

Each AT 106 may communicate with one or more nodes 104 on a forward link (FL) and/or a reverse link (RL) at a given moment. A FL is a communication link from a node to an AT. A RL is a communication link from an AT to a node. The FL may also be referred to as the downlink. Further, the RL may also be referred to as the uplink. The nodes 104 may be interconnected, for example, by appropriate wired or wireless interfaces and may be able to communicate with each other. Accordingly, each AT 106 may communicate with another AT 106 through one or more nodes 104. For example, the AT 106j may communicate with the AT 106h as follows. The AT 106j may communicate with the node 104d. The node 104d may then communicate with the node 104b. The node 104b may then communicate with the AT 106h. Accordingly, a communication is established between the AT 106j and the AT 106h.

The wireless communication network 100 may provide service over a large geographic region. For example, the cells 102a-102g may cover only a few blocks within a neighborhood or several square miles in a rural environment. In one embodiment, each cell may be further divided into one or more sectors (not shown).

As described above, a node 104 may provide an access terminal (AT) 106 access within its coverage area to a communications network, such as, for example the internet or a cellular network.

An AT 106 may be a wireless communication device (e.g., a mobile phone, router, personal computer, server, etc.) used by a user to send and receive voice or data over a communications network. An access terminal (AT) may also be referred to herein as a user equipment (UE), as a mobile station (MS), or as a terminal device. As shown, ATs 106a, 106h, and 106j comprise routers. ATs 106b-106g, 106i, 106k, and 106l comprise mobile phones. However, each of ATs 106a-106l may comprise any suitable communication device.

A wireless multiple-access communication system may simultaneously support communication for multiple wireless access terminals. As mentioned above, each access terminal may communicate with one or more nodes via transmissions on the forward and reverse links. The forward link (or downlink) refers to the communication link from the node to the access terminal, and the reverse link (or uplink) refers to the communication link from the access terminal to the node. This communication link may be established via a single-in-single-out system, a multiple-in-multiple-out ("MIMO") system, or some other type of system.

A MIMO system employs multiple (NT) transmit antennas and multiple (NR) receive antennas for data transmission. A MIMO channel formed by the NT transmit and NR receive antennas may comprise NS independent channels, which are also referred to as spatial channels, where NS≤min{NT, NR}. Each of the NS independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables a device (e.g., a node, an access terminal, etc.) to extract a transmit beam-forming gain on the forward link when multiple antennas are available at the device.

The teachings herein may be incorporated into a device (e.g., a node, an access terminal, etc.) employing various components for communicating with at least one other device.

Figure 2:
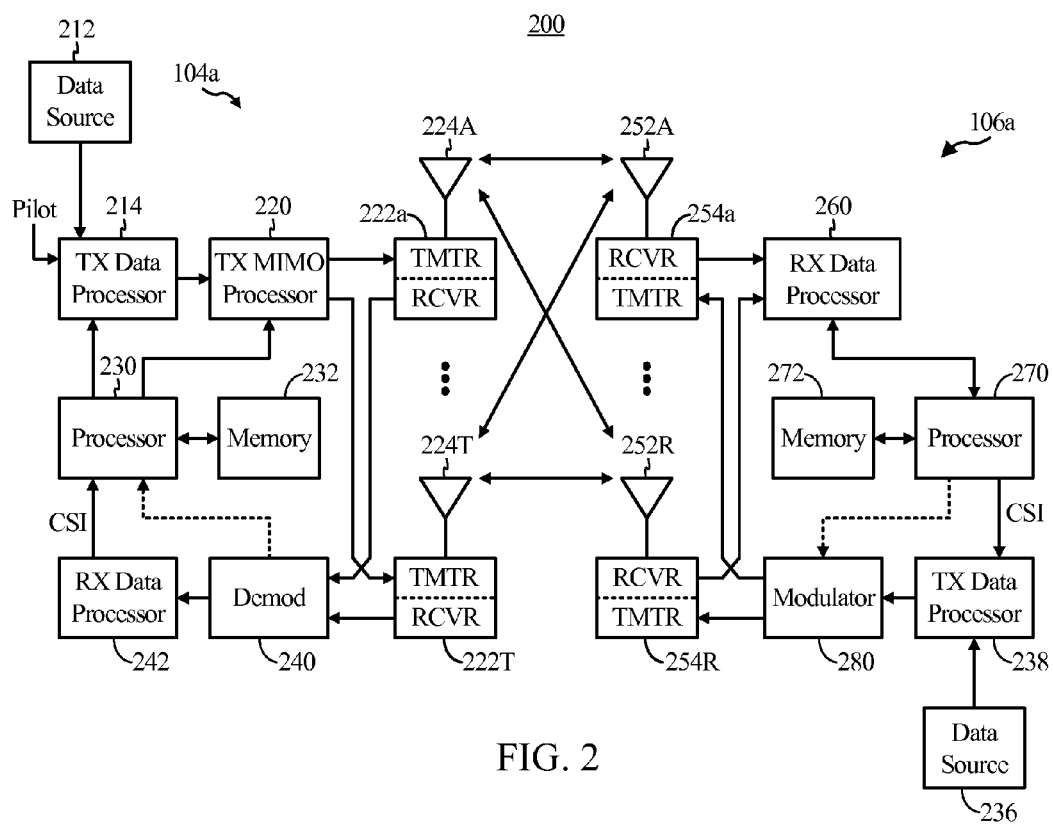
FIG. 2 illustrates functional block diagrams of an exemplary node and an exemplary access terminal shown in FIG. 1.

FIG. 2 illustrates functional block diagrams of an exemplary node 104a and an exemplary access terminal 106a shown in FIG. 1. In a MIMO system 200, the node 104a communicates with one or more ATs such as the AT 106a. At the node 104a, traffic data for a number of data streams is provided from a data source 212 to a transmit ("TX") data processor 214.

In one embodiment, each data stream is transmitted over a respective transmit antenna. The TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 230. A data memory 232 may store program code, data, and other information used by the processor 230 or other components of the node 104a.

The modulation symbols for all data streams are then provided to a TX MIMO processor 220, which may further process the modulation symbols (e.g., for OFDM). The TX MIMO processor 220 then provides NT modulation symbol streams to NT transceivers ("XCVR") 222A through 222T. In some aspects, the TX MIMO processor 220 applies beam-forming weights to the symbols of the data streams and to the antenna from which the symbol is being transmitted.

Each transceiver 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 222A through 222T are then transmitted from NT antennas 224A through 224T, respectively.

At the AT 106a, the transmitted modulated signals are received by NR antennas 252A through 252R and the received signal from each antenna 252 is provided to a respective transceiver ("XCVR") 254A through 254R. Each transceiver 254 conditions (e.g., filters, amplifies, and downconverts) a respective received signal, digitizes the conditioned signal to provide samples, and further processes the samples to provide a corresponding "received" symbol stream.

A receive ("RX") data processor 260 then receives and processes the NR received symbol streams from NR transceivers 254 based on a particular receiver processing technique to provide NT "detected" symbol streams. The RX data processor 260 then demodulates, deinterleaves, and decodes each detected symbol stream to recover the traffic data for the data stream. The processing performed by the RX data processor 260 is complementary to that performed by the TX MIMO processor 220 and the TX data processor 214 at the node 104a.

A processor 270 periodically determines which pre-coding matrix to use (discussed below). The processor 270 formulates a reverse link message comprising a matrix index portion and a rank value portion. A data memory 272 may store program code, data, and other information used by the processor 270 or other components of the AT 106a.

The reverse link message may comprise various types of information regarding the communication link and/or the received data stream. The reverse link message is then processed by a TX data processor 238. The TX data processor 238 also receives traffic data for a number of data streams from a data source 236. The modulator 280 modulates the data streams. Further, the transceivers 254A through 254R condition the data streams and transmit the data streams back to the node 104a.

The TX data processor 238 may be configured to control modulation of information transmitted over the reverse link to the node 104a. Information transmitted may comprise, for example, control information (e.g., channel quality indication (CQI) feedback, acknowledgement/negative acknowledgement (ACK/NACK), hybrid automatic repeat request (HARQ) information, uplink scheduling requests, other payload, etc.). Information transmitted may further comprise, for example, content data (e.g., audio data, video data, etc.) to be sent to the node 104a. The TX data processor 238 may be configured to direct transmission of the information over a frequency range. Further, the TX data processor 238 may be configured to divide the frequency range into smaller sets of frequency ranges. One or more of these smaller sets of frequency ranges may be referred to as a channel. Each channel may be allocated for transmission of a particular type of information. For example, a control channel (e.g., a physical uplink control channel (PUCCH)) may be used to transmit only control information. Further, a data channel (e.g., a physical uplink shared channel (PUSCH)) may be used to transmit only content data. In another embodiment, the data channel may be used to transmit both control information and content data. The TX data processor 238 may direct the modulator 280 to modulate the information over particular channels and direct the transceivers 254 to transmit the information over the particular channels. Further, the transmission of the information may be divided into time intervals referred to as frames. The frames may further be divided into smaller time intervals referred to as subframes. The transmission of information over different channels during one or more frames and one or more subframes is further discussed below with respect to FIGS. 3 & 4.

At the node 104a, the modulated signals from the AT 106a are received by the antennas 224. Further, the transceivers 222 condition the modulated signals. A demodulator ("DEMOD") 240 demodulates the modulated signals. A RX data processor 242 processes the demodulated signals and extracts the reverse link message (e.g., information) transmitted by the AT 106a. The processor 230 then determines which precoding matrix to use for determining the beam-forming weights. Further, the processor 230 processes the extracted message.

Figure 3:
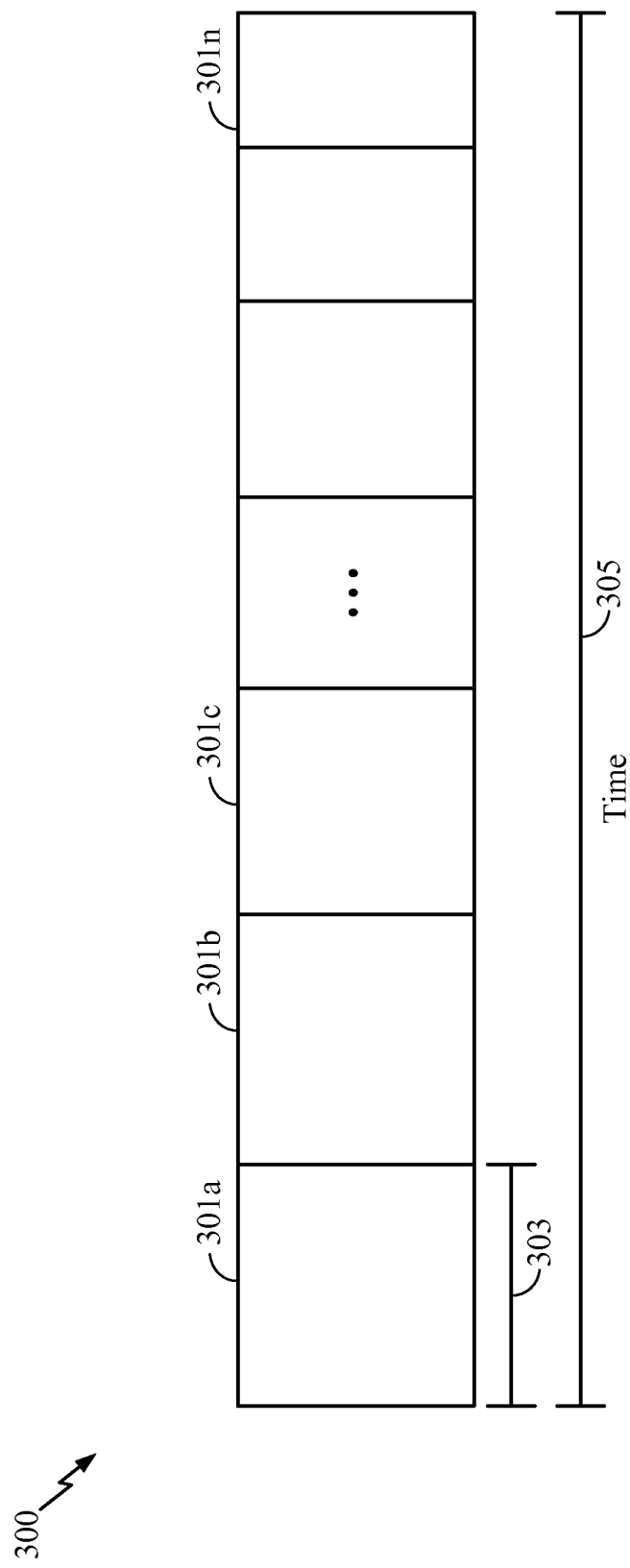
FIG. 3 illustrates an exemplary frame for transmitting information from one or more ATs to one or more nodes shown in FIGS. 1 and 2.

FIG. 3 illustrates an exemplary frame for transmitting information from one or more ATs 106 to one or more nodes 104 shown in FIGS. 1 and 2. In one embodiment the frame 300, is a sequence of time intervals during which communications between ATs 106 and nodes 104 are scheduled. As shown, in the time domain the frame 300 spans a time interval 305. The frame 300 is further divided in the time domain into a plurality of subframes 301a, 301b, 301c, etc. Each subframe 301 spans a time interval 303. One or more ATs 106 may transmit information (e.g., control information and/or content data) to one or more nodes 104 during the frame over one or more communications channels. For example, the AT 106b may need to transmit control information to the node 104a at a time that falls within the time interval 303 of the subframe 301a. The AT 106b may transmit control information to the node 104a during the subframe 301a. Further, the AT 106a may also need to transmit control information to the node 104a at a time that falls within the time interval 303 of the subframe 301a. Accordingly, the AT 106b may also transmit control information to the node 104a during the subframe 301a. Therefore, multiple ATs may transmit control information during a single subframe 301. Further, each AT may transmit control information as necessary over multiple subframes 301 when transmitting updated control information. For example, the AT 106a may transmit control information during the subframe 301a to the node 104a. The AT 106a may further transmit control information during the subframe 301c to the node 104a with updated control information. Similarly, the ATs 106 may further transmit other types of information during the frame 300. The allocation of resources for transmissions between ATs 106 and nodes 104 within the frame 300 and in particular within each subframe 301 is further discussed below with respect to FIG. 4.

Figure 4:
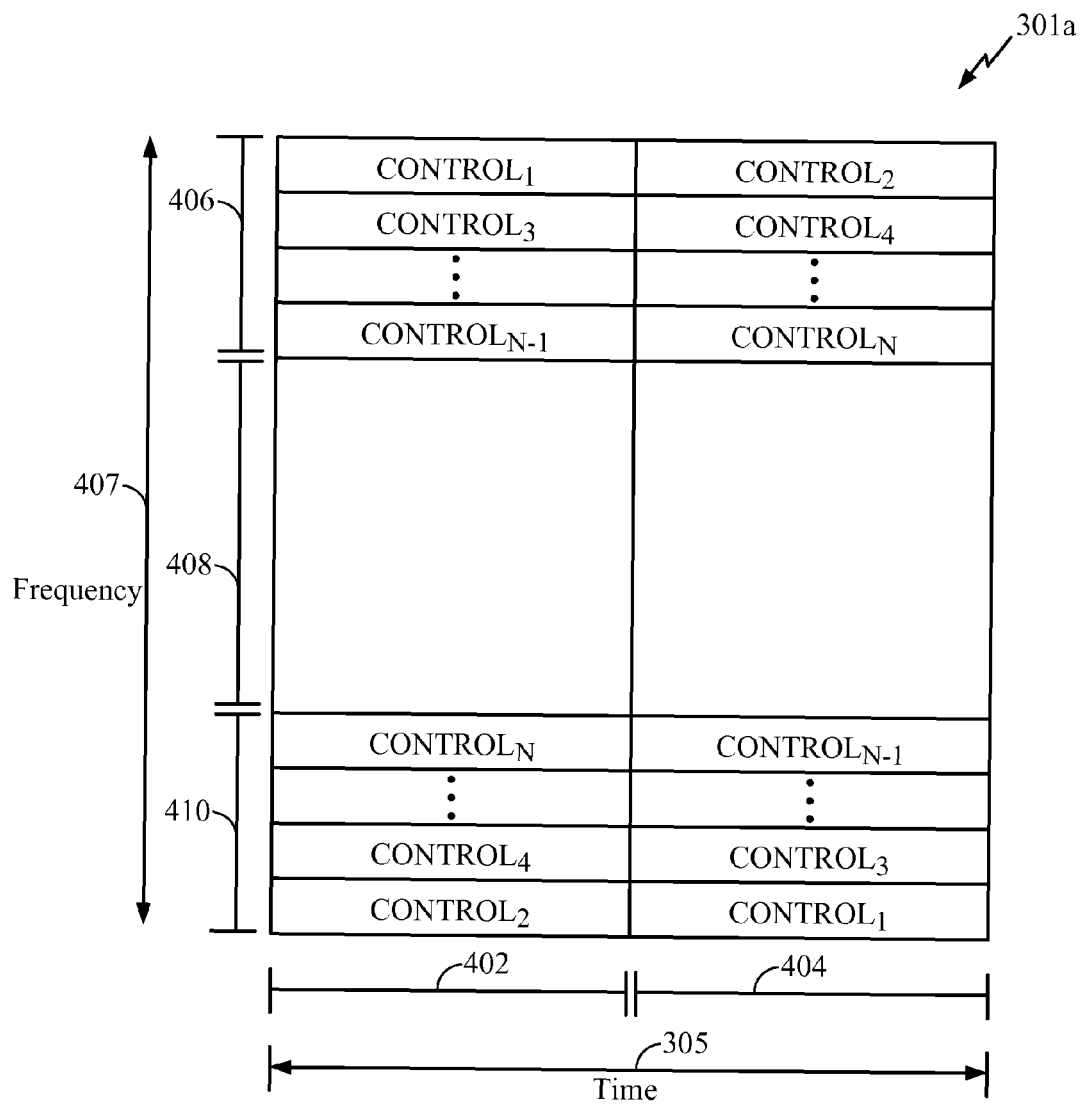
FIG. 4 illustrates an exemplary subframe of a frame of FIG. 3 for transmitting information over time and frequency from one or more ATs to one or more nodes shown in FIGS. 1 and 2.

FIG. 4 illustrates an exemplary subframe 301a of a frame 300 of FIG. 3 for transmitting information over time and frequency from one or more ATs to one or more nodes shown in FIGS. 1 and 2. The subframe 301a occupies a frequency range 407 and a time interval 305. In the time domain, the subframe is divided into two slots, a slot 402 and a slot 404. In the frequency domain, the subframe is divided into three frequency ranges 406, 408, and 410. The first frequency range 406 and the third frequency range 410 are each allocated for transmission of control information. Accordingly, the first frequency range 406 and the third frequency range 410 combined may be referred to as the control channel. The second frequency range 408 may be allocated for transmission of content data. Accordingly, the second frequency range 408 may be referred to as the data channel.

In one embodiment, the two slots 402 and 404 and the three frequency ranges 406, 408, and 410 of the subframe 301a may be allocated among a plurality of physical resource blocks (PRBs) (e.g., control blocks and/or data blocks). Each PRB may occupy one or more time intervals in the time domain and one or more frequency ranges in the frequency domain. Accordingly, a PRB is a communications resource in the time domain and the frequency domain over which ATs and nodes may communicate. The control blocks may be allocated within the subframe 301a as follows.

A first set of control blocks $Control_1$, $Control_3$, $Control_{N-1}$, etc. may occupy the first frequency range 406 during the slot 402. The first set of control blocks may be allocated sequentially over the first frequency range 406 during the slot 402 as shown in FIG. 4 starting from the highest frequency of the frequency range 407 on down. The first set of control blocks $Control_1$, $Control_3$, $Control_{N-1}$, etc. may further occupy the third frequency range 410 during the slot 404. The first set of control blocks may be allocated sequentially over the third frequency range 410 during the slot 404 as shown in FIG. 4 starting from the lowest frequency of the frequency range 407 on up. The allocation of a single PRB to different frequencies during different slots of the subframe 301a is referred to as "frequency hopping."

Similarly, a second set of control blocks $Control_2$, $Control_4$, $Control_N$, etc. may occupy the third frequency range 410 during the slot 402. The second set of control blocks may be allocated sequentially over the third frequency range 410 during the slot 402 as shown in FIG. 4 starting from the lowest frequency of the frequency range 407 on up. The second set of control blocks $Control_2$, $Control_4$, $Control_N$, etc. may further occupy the first frequency range 406 during the slot 404. The second set of control blocks may be allocated sequentially over the first frequency range 406 during the slot 404 as shown in FIG. 4 starting from the highest frequency of the frequency range 407 on down.

In the frequency domain, each control block may be further divided into a plurality of subcarrier frequencies (e.g., 12 subcarriers). Each subcarrier may correspond to a particular frequency interval (e.g., 15 kHz). The number of control blocks in the control channel may be fixed or variable.

Further, control information may be sent using different sequences (e.g., orthogonal codes, cyclic shifts, etc.) within a single control block. Accordingly, each control block may support transmission of multiple sets of control information. Each set of control information may be modulated using a different orthogonal code. By using orthogonal codes, each of the sets of control information may be sent over a single control block, but may still be distinguishable from each other as is known in the art. For example, control information from the AT 106a may be sent to the node 104a within the control block $Control_1$ using a first sequence. Further, control information from the AT 106b may be sent to the node 104a within the control block $Control_1$ using a second sequence.

Methods and systems described herein support increased payload for transmitting control information from the AT 106a to the node 104a. For example, embodiments described herein refer to novel allocations of channel resources (e.g., blocks, sequences, etc.) over one or more subframes 301 for transmission of control information. Some such methods and systems may be used in conjunction with, but are not limited to, existing systems (e.g., LTE release 8 systems).

The methods and systems described herein are an improvement over previously existing methods and systems that are limited in the amount of control information that can be sent from an AT to a node. For example, some ATs (e.g., a "legacy" device) may be configured to transmit information on an existing system (e.g., LTE release 8 systems) using particular resources. The operational requirements (e.g., use of particular resources) of such a legacy device may predate the operational requirements of devices described herein (e.g., AT 106*a*). In the previous systems, the legacy device may be limited to sending control information to the node 104*a* utilizing only a single sequence of a single control block. Utilizing the methods and systems described herein, an AT (e.g., the AT 106*a*) may be configured to utilize additional resources to send additional control information to a node (e.g., the node 104*a*).

In one embodiment, the AT 106*a* may be configured to send control information over multiple control blocks. For example, control blocks $Control_1$ and $Control_2$ may be allocated for transmission of control information by AT 106*a* to node 104*a*. The use of multiple control blocks may allow for the AT 106*a* to send additional control information to the node 104*a* as compared to the amount of information sent using only a single control block. In one embodiment, the multiple control blocks may be allocated over a contiguous frequency range (e.g., if the AT 106*a* only supports SC-FDMA transmission on the uplink), such as over control blocks $Control_1$ and $Control_3$.

In another embodiment, the multiple control blocks may be allocated over a non-contiguous frequency range (e.g., if the AT 106*a* supports other modulation schemes such as OFDMA, Nx SC-FDMA, clustered SC-FDMA etc. on the uplink), such as control blocks $Control_1$ and $Control_2$.

In another embodiment, the AT 106*a* may be configured to use multiple sequences to transmit control information to the node 104*a* over one or more control blocks. For example, AT 106*a* may divide control information into multiple sets, modulate each set using a different one of a plurality of orthogonal codes, and send each set of the control information over the control block $Control_1$. In one embodiment, each set modulated using a particular orthogonal code may be sent via a different antenna 252 (or virtual antenna).

In yet another embodiment, the AT 106*a* may be configured to choose one or more sequences from multiple sequences of one or more control blocks to modulate and transmit control information. The AT 106*a* may convey information by choosing which of the sequences to use to transmit control information. For example, the AT 106*a* may be configured to use sequences A, B, C and D (each corresponding to a different orthogonal code) of control block $Control_1$ for modulating control information for transmission to the node 104*a*. Each sequence may be configured to modulate K bits of information. Further, each sequence itself may correspond to a bit value. A could be the bit value "00," B could be the bit value "01," C could be the bit value "10," and D could be the bit value "11." Accordingly, in one embodiment, the choice of sequence to modulate information corresponds to an additional two bits. Therefore, K+2 bits of information may be sent using a single sequence, where K-bits are modulated and 2 bits correspond to the sequence chosen. One of ordinary skill in the art will recognize that an AT 106*a* may choose from fewer or more sequences to modulate and transmit control information. Accordingly, fewer or more bits may be conveyed by the choice of sequence used to modulate and transmit date. In one embodiment, the number of bits conveyed is half of the number of sequences that the AT 106*a* may choose between.

In another embodiment, the AT 106*a* may be configured to use modulation formats that increase the number of data streams (e.g., sets of control information) that may be sent over each control block $Control_1$, $Control_2$, $Control_3$, etc. as compared to previously existing systems used by legacy devices. For example, previous systems may utilize only binary phase-shift keying (BPSK) and quadrature phase-shift keying (QPSK), which as is known in the art, have a limited bandwidth. In one embodiment, the AT 106*a* may use higher order modulation formats known in the art such as 8-PSK, 16-PSK, etc. to modulate data to be sent over the control block $Control_1$. Accordingly, the AT 106*a* may send a greater amount of information over each control block.

In yet another embodiment, the AT 106*a* may further utilize control blocks spanning over multiple subframes 301 to send control information to the node 104*a*. For example, the AT 106*a* may divide control information into multiple sets, modulate each set separately, and transmit each set over one of a plurality of different control blocks, wherein the plurality of different control blocks correspond to control blocks of a plurality of subframes (e.g., subframe 301*a* and subframe 301*b* of FIG. 3). Accordingly, each set of control information received at the node 104*a* may be decoded individually. In another example, the AT 106*a* may jointly code (e.g., using a Reed-Solomon code) the control information over a plurality of control blocks spanning a plurality of subframes (e.g., subframe 301*a* and subframe 301*b* of FIG. 3) and send the control information over the plurality of control blocks spanning a plurality of subframes to the node 104*a*. Accordingly, the node 104*a* may only be able to decode the control information after receiving all of the control blocks containing the control information.

Figure 5:
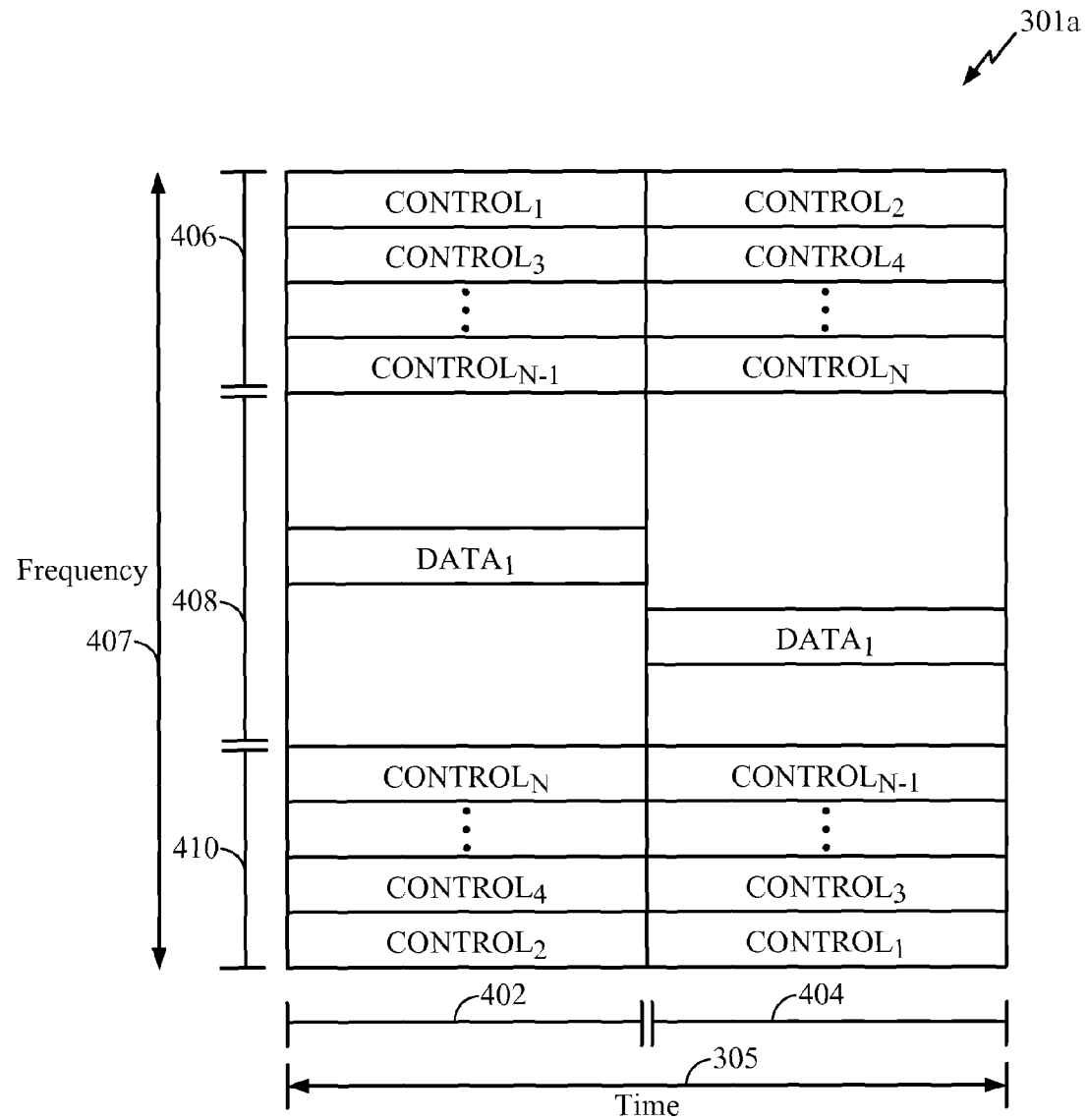
FIG. 5 illustrates another exemplary subframe of a frame of FIG. 3 for transmitting information over time and frequency from one or more ATs to one or more nodes shown in FIGS. 1 and 2.

FIG. 5 illustrates another exemplary subframe 301*a* of a frame 300 of FIG. 3 for transmitting information over time and frequency from one or more ATs to one or more nodes shown in FIGS. 1 and 2. As shown, in this embodiment, subframe 301*a* comprises the same structure as described above with respect to FIG. 4. As discussed above, a legacy device may be configured to transmit control information using a single sequence in a single control block (e.g., $Control_1$, $Control_2$, $Control_3$, etc.). Legacy devices may further be configured to transmit control information along with content data in the second frequency range 308 in data blocks (e.g., data block $Data_1$). The legacy device may not be configured to send only control information in the data blocks without content data. Therefore, the designation of the second frequency range 308 as the data channel may be for previous systems using legacy devices. However, as shown, only control information is sent by the AT 106*a* to the node 104*a* not only in the first frequency range 306 and the third frequency range 310 in control blocks $Control_1$, $Control_2$, $Control_3$, etc., but also in the second frequency range 308 in data blocks (e.g., data block $Data_1$). Accordingly, only control information may be sent from the AT 106*a* to the node 104*a* in the data channel as well as the control channel. In another embodiment, the AT 106*a* may send only control information to the node 104*a* using only the data channel. Therefore, the AT 106*a* is not restricted to sending control information in the data channel when it also has content data to send. The AT 106*a* may send control information in the data channel without content data.

Allocation of the various resources described above may be carried out by a reservation process. For example, the node 104*a* may schedule the transmission of control information from each of the AT 106*a* and the AT 106*b* to the node 104*a*. Scheduling may be carried out for example by the processor 230 of the node 104*a*. Further, each of the AT 106*a* and the AT 106*b* may need to be informed of the reservation of resources. As discussed above, an AT (e.g., a legacy AT) may be configured to utilize a previously existing system (e.g., LTE release 8, etc.) and therefore may reserve resources differently than the AT 106*a*. For example, the AT 106*a* may transmit control information using the data channel. In one embodiment, such resources on the data channel may not be made available to a legacy AT. Therefore, to "notify" the legacy AT of the reservation of such a resource on the data channel, the node 104*a* may reserve the resources on the data channel to a virtual AT. The AT 106a recognizes the virtual AT as a resource for sending control information. The legacy AT may see the reservation as a typical data reservation for an AT. Accordingly, neither the AT 106a nor the legacy AT will attempt to reserve the already reserved resource. Similarly, other techniques to inform AT 106a of certain reservations of resources may be used that are compatible with the functionality of the AT 106b. In one embodiment, some resources (e.g., PRBs, and/or sequences are reserved only for legacy devices and other resources are reserved for ATs described herein (e.g., AT 106a). Therefore, in one embodiment, a given PRB may be used by either legacy devices or ATs described herein, but not both. Accordingly, the sequences (e.g., orthogonal codes) used for a PRB for legacy devices may be different than the sequences used for PRB of ATs described herein. The difference in sequences arises from the different ways in which information is modulated and sent as would be understood by one of ordinary skill in the art.

Figure 6:
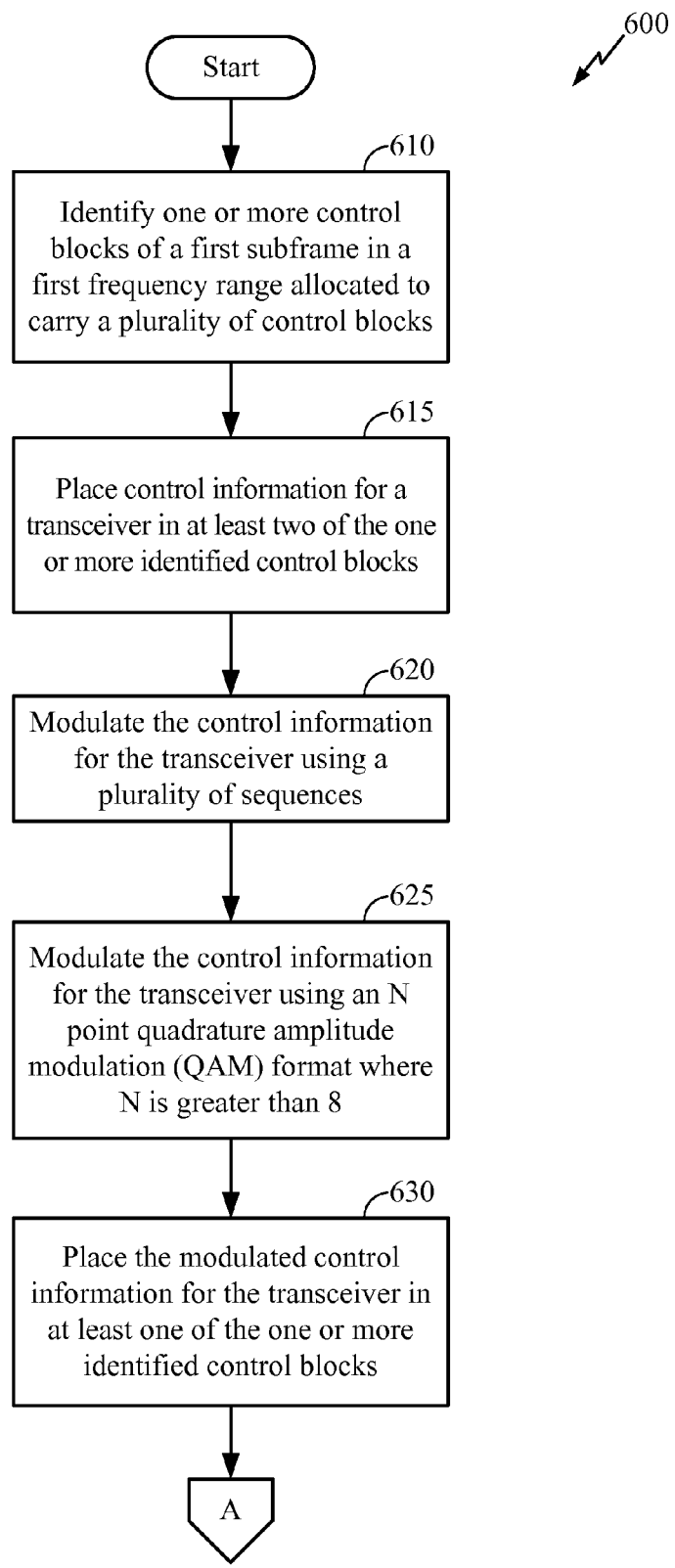
FIG. 6 is a flowchart of an exemplary process of transmitting control information from an AT to a node of FIGS. 1 & 2.
Figure 6:
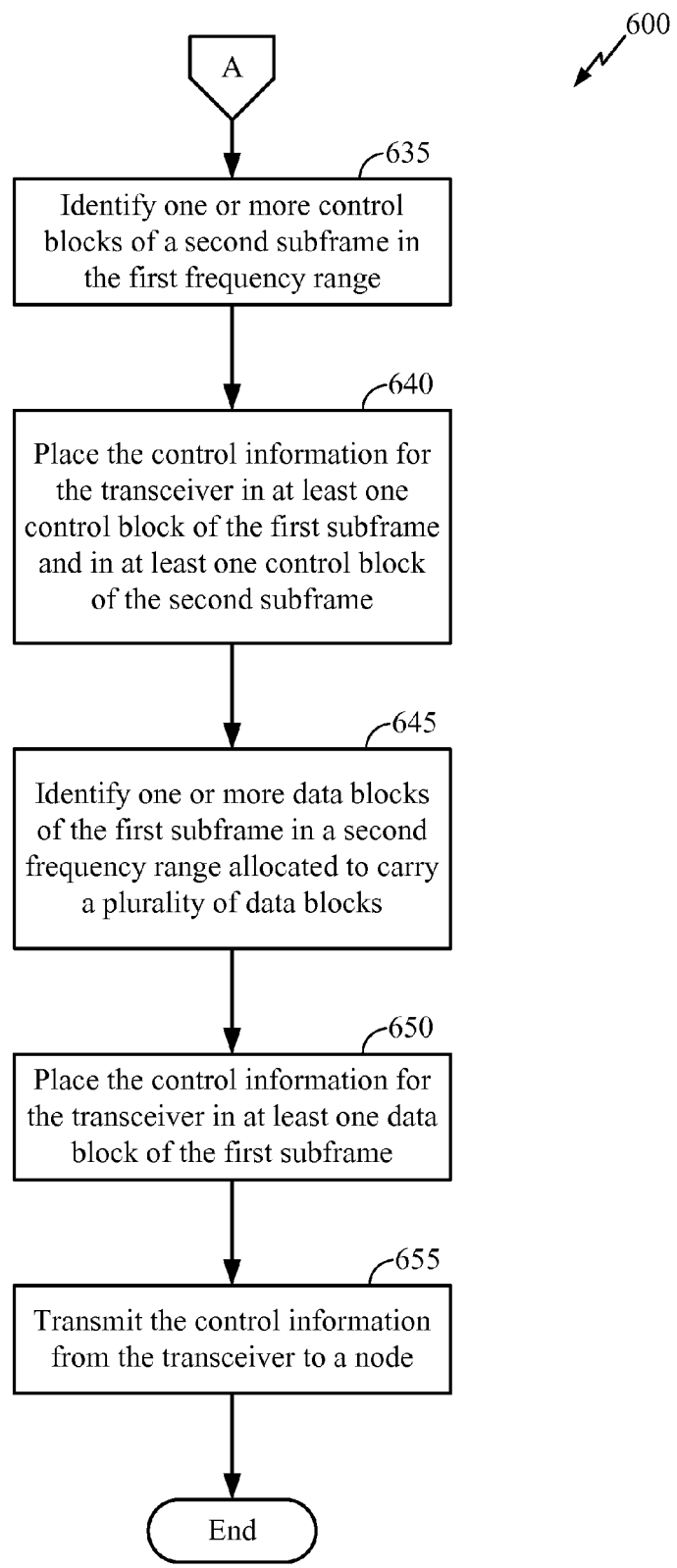

FIG. 6 is a flowchart of an exemplary process of transmitting control information from an AT 106a to a node 104a of FIGS. 1 & 2. The process 600 is one embodiment of a process used to allocate resources of a communication channel for transmission of control information from the AT 106a to the node 104a as discussed above with respect to FIGS. 3-5. As discussed in connection with FIG. 4, the AT 106a may be configured to transmit control information to the node 104a within one or more PRBs (e.g., control blocks and data blocks). The one or more PRBs may be allocated over the time domain and the frequency domain within the subframe 301a. The subframe 301a may be one of a plurality of subframes 301 in a frame 300. Accordingly, the process 600 represents a process of allocating one or more PRBs for the AT 106a to transmit control information to the node 104a.

At a first step 610, the AT 106a identifies one or more control blocks of a first subframe 301a in one or more frequency ranges. In one embodiment, the control blocks are allocated over a first frequency range and a second frequency range in the first subframe 301a. Continuing at an optional step 615, the AT 106a places control information for the AT 106a in at least two of the one or more identified control blocks of the first subframe. Next, at an optional step 620, the AT 106a modulates the control information using a plurality of sequences. Further, at another optional step 625, the AT 106a modulates the control information using an N point quadrature amplitude modulation (QAM) format where N is greater than 8. At an optional step 630, the AT 106a places the modulated control information in at least one of the one or more identified control blocks.

Continuing at an optional step 635, the AT 106a further identifies one or more control blocks of a second subframe in the one or more frequency ranges. Next at the optional step 640, the AT 106a places the control information in at least one control block of the first subframe and at least one control block of the second subframe. In one embodiment, the control information is jointly coded over the at least one control block of the first subframe and the at least one control block of the second subframe.

Next, at an optional step 645, the AT 106a identifies one or more data blocks of the first subframe in one or more frequency ranges that are different than the one or more frequency ranges over which the control blocks are allocated. Continuing at an optional step 650, the AT 106a places only the control information in at least one of the one or more data blocks without placing data in the one or more data blocks. At a step 655, the AT 106a transmits the control information over the blocks the control information is placed in to the node 104a.

Figure 7:
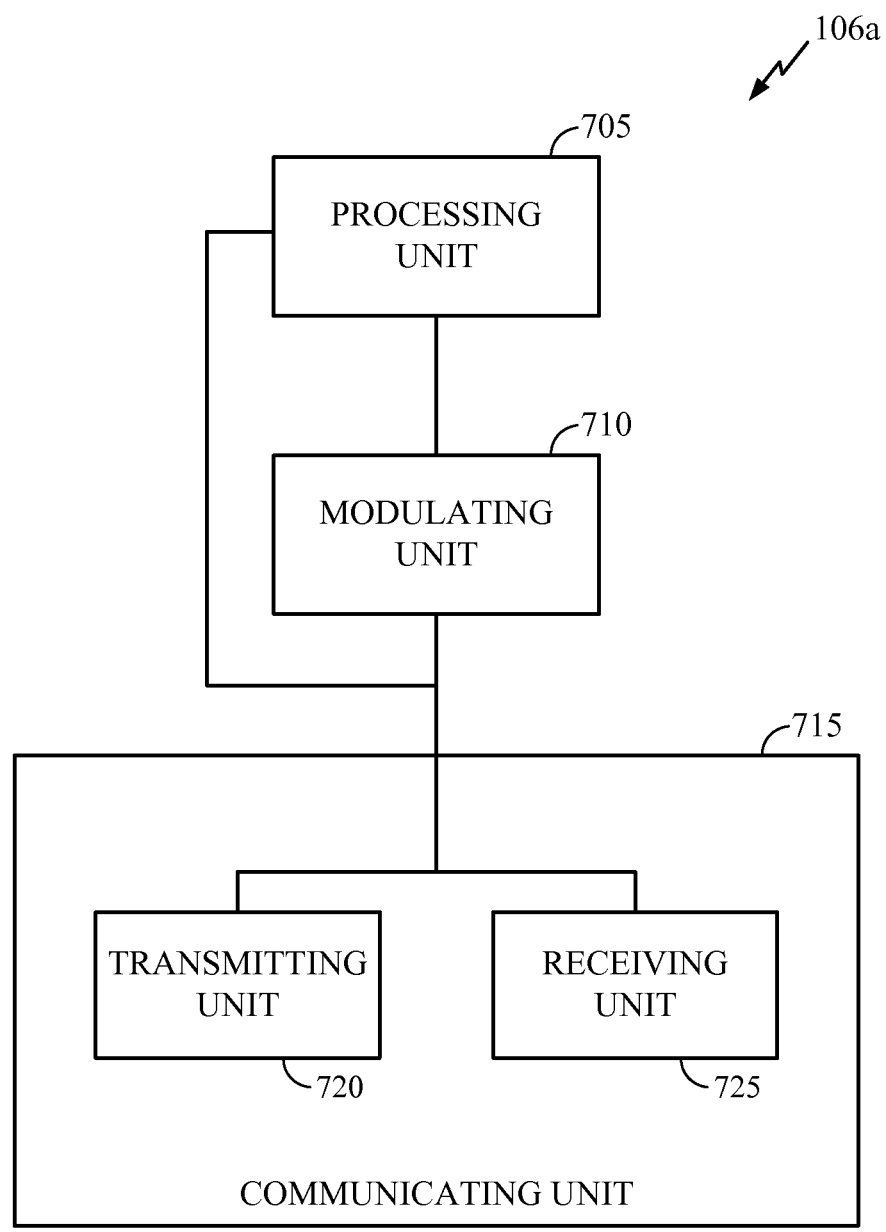
FIG. 7 is a functional block diagram of yet another exemplary AT shown in FIG. 2.
Figure 8:
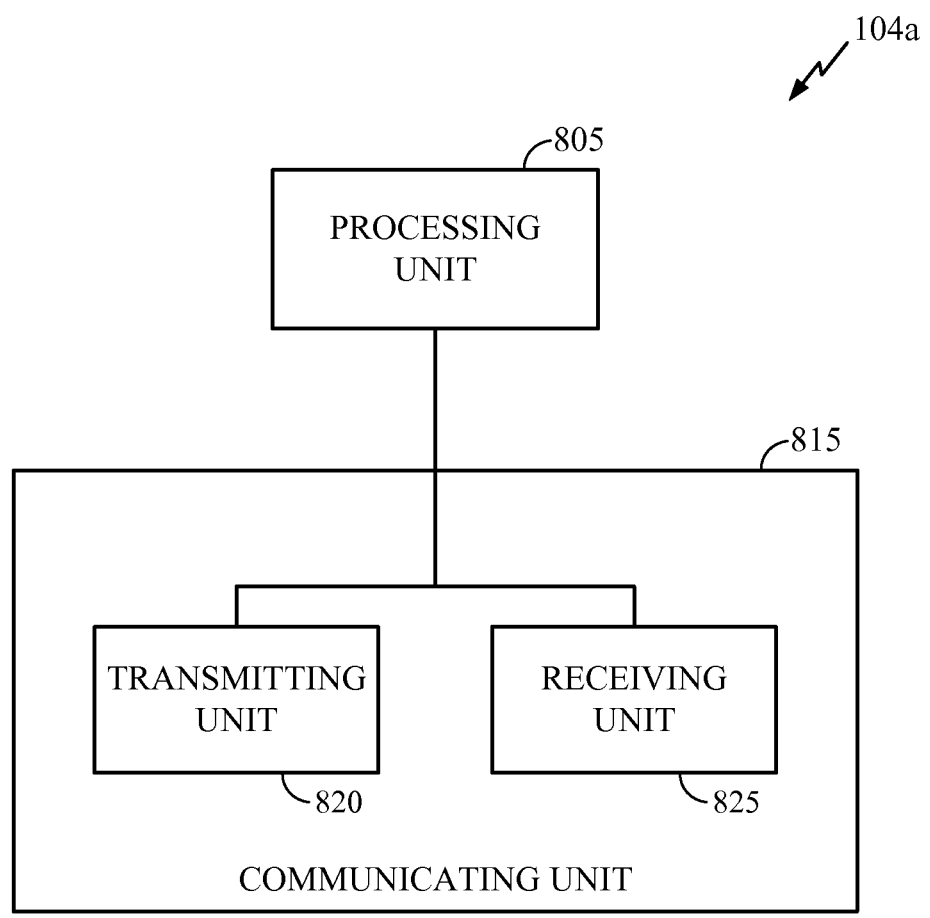
FIG. 8 is a functional block diagram of yet another exemplary node shown in FIG. 2.

The functionality described herein (e.g., with regard to one or more of the accompanying figures) may correspond in some aspects to similarly designated "means for" functionality in the appended claims. Referring to FIGS. 7 and 8, apparatuses 106a and 104a are represented as a series of interrelated functional modules.

FIG. 7 is a functional block diagram of yet another exemplary AT 106a shown in FIG. 2. As shown, the AT 106a may comprise a processing unit 705, a modulating unit 710, and a communicating unit 715 comprising a transmitting unit 720 and a receiving unit 725. The processing unit 705 may correspond at least in some aspects to, for example, a processor and/or a TX data processor as discussed herein. The modulating unit 710 may correspond at least in some aspects to, for example, a modulator as discussed herein. The communicating unit 715 may correspond at least in some aspects to, for example, transceiver as discussed herein. The transmitting unit 720 may correspond at least in some aspects to, for example, a transmitter as discussed herein. The receiving unit 725 may correspond at least in some aspects to, for example, a receiver as discussed herein.

FIG. 8 is a functional block diagram of yet another exemplary node 104a shown in FIG. 2. As shown, the node 104a may comprise a processing unit 805 and a communicating unit 815 comprising a transmitting unit 820 and a receiving unit 825. The processing unit 805 may correspond at least in some aspects to, for example, a processor and/or a TX data processor as discussed herein. The communicating unit 815 may correspond at least in some aspects to, for example, transceiver as discussed herein. The transmitting unit 820 may correspond at least in some aspects to, for example, a transmitter as discussed herein. The receiving unit 825 may correspond at least in some aspects to, for example, a receiver as discussed herein.

The functionality of the modules of FIGS. 7 & 8 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

While the specification describes particular examples of the present invention, those of ordinary skill can devise variations of the present invention without departing from the inventive concept. For example, the teachings herein refer to MIMO systems but are equally applicable to other systems such higher order MIMO systems and CoMP (network MIMO/coordinated multi point transmissions).

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP communication, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor may read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A wireless communication apparatus operative in a communication network, the apparatus comprising:
   a transceiver configured to:
   transmit control information over a first frequency range and content data over a second frequency range during a first predetermined time interval, wherein the first frequency range is allocated to carry a first plurality of control blocks allocated contiguously over the first frequency range, for transmitting only the control information, and wherein duration of each of the first plurality of control blocks spans over the entire duration of the first predetermined time interval; and
   identify a first control block of the first plurality of control blocks;
   modulate a plurality of portions of the control information using a plurality of different sequences to modulate the first control block of the first plurality of control blocks, wherein the plurality of sequences comprise a plurality of orthogonal codes; and
   a processing circuit configured to direct at least a portion of the control information of the transceiver over the second frequency range for transmission to a base station node,
   wherein the plurality of sequences is configured to allow the base station node to uniquely identify the modulated plurality of portions of the control information from other control information transmitted concurrently to the base station node.

2. The apparatus of claim 1, wherein the transceiver is further configured to communicate information by selectively modulating the plurality of portions of the control information using one or more of the plurality of sequences and refraining from modulating the plurality of portions of the control information using the other plurality of sequences not corresponding to said one or more of the plurality of sequences.

3. The apparatus of claim 1, wherein a modulation format used to modulate the plurality of portions of the control information comprises a N point quadratus amplitude modulation (QAM) format, wherein N is greater than or equal to 8.

4. The apparatus of claim 1, wherein the processing circuit is further configured to direct the control information of the transceiver over the first plurality of control blocks for transmission to the base station node, and wherein the first frequency range comprises a contiguous frequency range.

5. The apparatus of claim 1, wherein the processing circuit is further configured to direct the control information of the transceiver over the first plurality of control blocks for transmission to the base station node, and wherein the transceiver is further configured to:
   transmit control information and content data during a second predetermined time interval that is different than the first predetermined time interval, wherein the processing circuit is further configured to direct the control information over a second plurality of control blocks for transmission to the base station node, and wherein duration of each of the second plurality of control blocks spans over the entire duration of the second predetermined time interval; and
   transmit control information and content data during a third predetermined time interval that is different than the first predetermined time interval and the second predetermined time interval, wherein the processing circuit is further configured to direct the control information over a third plurality of control blocks for transmission to the base station node, and wherein duration of each of the third plurality of control blocks spans over the entire duration of the third predetermined time interval.

6. The apparatus of claim 1, wherein the first frequency range comprises a physical uplink control channel (PUCCH).

7. The apparatus of claim 1, wherein the processing circuit is further configured to direct the content data of the transceiver over the second frequency range for transmission to the base station.

8. The apparatus of claim 1, wherein the processing circuit is further configured to direct the control information of the transceiver over a first control block of the plurality of control blocks for transmission to the base station via a first antenna and over a second control block of the plurality of control blocks for transmission to the base station via a second antenna.

9. The apparatus of claim 1, wherein the processing circuit is further configured to direct the control information of the transceiver over the first plurality of control blocks for transmission to the base station node, and wherein the transceiver is further configured to transmit the control information over a third frequency range that is different from the first frequency range and the second frequency range during a second predetermined time interval, wherein the third frequency range is allocated to carry the first plurality of control blocks for transmitting only the control information, wherein duration of each of the first plurality of control blocks further spans over the entire duration of the second predetermined time interval.

10. The apparatus of claim 1, wherein the processing circuit is further configured to direct the control information of the transceiver over the first plurality of control blocks for transmission to the base station node, wherein the first frequency range is allocated to further carry a second plurality of control blocks for transmitting control information of another communication apparatus that is in communication with the base station node, and wherein the other communication apparatus belongs to a set of communication devices conforming to operational requirements that predate operational requirements of the apparatus.

11. A wireless communication apparatus operative in a communication network, the apparatus comprising:
   a processing circuit configured to schedule transmission of control information over a first frequency range and content data over a second frequency range during a first predetermined time interval, wherein the first frequency range is allocated to carry a first plurality of control blocks allocated contiguously over the first frequency range, for transmitting only the control information, wherein duration of each of the first plurality of control blocks spans over the entire duration of the first predetermined time interval, and configured to identify a first control block of the first plurality of control blocks, wherein a plurality of portions of the control information are modulated using a plurality of different sequences comprising a plurality of orthogonal codes, and wherein the processing circuit is further configured to schedule transmission of the modulated plurality of portions of the control information in the first control block of the first plurality of control blocks; and
   a transceiver configured to send a schedule of the scheduled transmission to a first communication device to direct transmission of at least a portion of the control information of the first communication device over the second frequency range, wherein the plurality of sequences is configured to allow the base station node to uniquely identify the modulated plurality of portions of the control information from other control information transmitted concurrently to the base station node.

12. The apparatus of claim 11, wherein a modulation format used to modulate the plurality of portions of the control information comprises a N point quadrature amplitude modulation (QAM) format, wherein N is greater than or equal to 8.

13. The apparatus of claim 11, wherein the schedule further directs transmission of the control information of the first communication device over the first plurality of control blocks, and wherein the first frequency range comprises a contiguous frequency range.

14. The apparatus of claim 11, wherein the schedule further directs transmission of the control information of the first communication device over the first plurality of control blocks, and wherein the processing circuit is further configured to:
   schedule transmission of control information and content data during a second predetermined time interval that is different than the first predetermined time interval, wherein the schedule further directs transmission of the control information over a second plurality of control blocks, and wherein duration of each of the second plurality of control blocks spans over the entire duration of the second predetermined time interval; and
   schedule transmission of control information and content data during a third predetermined time interval that is different than the first predetermined time interval and the second predetermined time interval, wherein the schedule further directs transmission of the control information over a third plurality of control blocks, and wherein duration of each of the third plurality of control blocks spans over the entire duration of the third predetermined time interval.

15. The apparatus of claim 11, wherein the first frequency range comprises a physical uplink control channel (PUCCH).

16. The apparatus of claim 11, wherein the schedule further directs transmission of the content data of the communications device over the second frequency range.

17. The apparatus of claim 11, wherein the schedule further directs transmission of the control information of the first communication device over the first plurality of control blocks, wherein the processing circuit is further configured to schedule transmission of the control information over a third frequency range that is different from the first frequency range and the second frequency range during a second predetermined time interval, wherein the third frequency range is allocated to carry the first plurality of control blocks for transmitting only the control information, wherein duration of each of the first plurality of control blocks further spans over the entire duration of the second predetermined time interval.

18. The apparatus of claim 11, wherein the schedule further directs transmission of the control information of the first communication device over the first plurality of control blocks, wherein the first frequency range is allocated to further carry a second plurality of control blocks for transmitting control information of a second communication device that is in communication with the apparatus, and wherein the second communication device belongs to a set of communication devices conforming to operational requirements that predate operational requirements of the first communication device.

19. A method of communicating between an access terminal and a base station node, the method comprising:
 identifying a first frequency range for transmission of control information and a second frequency range for transmission of content data during a first predetermined time interval, wherein the first frequency range is allocated to carry a first plurality of control blocks allocated contiguously over the first frequency range, for transmitting only the control information, and wherein duration of each of the first plurality of control blocks spans over the entire duration of the first predetermined time interval;
 identifying a first control block of the first plurality of control blocks;
 modulating a plurality of portions of the control information using a plurality of different sequences comprising a plurality of orthogonal codes; and
 transmitting at least a portion of the control information of the access terminal over the second frequency range to the base station node, wherein the control information comprises the modulated plurality of portions of the control information in the first control block of the first plurality of control blocks, wherein the plurality of sequences is configured to allow the base station node to uniquely identify the modulated plurality of portions of the control information from other control information transmitted concurrently to the base station node.

20. The method of claim 19, further comprising communicating information by selectively modulating the plurality of portions of the control information using one or more of the plurality of sequences and refraining from modulating the plurality of portions of the control information using the other plurality of sequences not corresponding to said one or more of the plurality of sequences.

21. The method of claim 19, wherein a modulation format used to modulate the plurality of portions of the control information comprises a N point quadrature amplitude modulation (QAM) format, wherein N is greater than or equal to 8.

22. The method of claim 19, further comprising transmitting the control information over the first plurality of control blocks to the base station node, wherein the first frequency range comprises a contiguous frequency range.

23. The method of claim 19, further comprising:
 transmitting the control information over the first plurality of control blocks to the base station node;
 transmitting control information over a second plurality of control blocks to the base station node, wherein duration of each of the second plurality of control blocks spans over the entire duration of a second predetermined time interval, and wherein the second predetermined time interval is different than the first predetermined time interval; and
 transmitting control information over a third plurality of control blocks to the base station node, wherein duration of each of the third plurality of control blocks spans over the entire duration of a third predetermined time interval, and wherein the third predetermined time interval is different than the first predetermined time interval.

24. The method of claim 19, wherein the first frequency range comprises a physical uplink control channel (PUCCH).

25. The method of claim 19, further comprising transmitting the content data of the access terminal over the second frequency range to the base station.

26. The method of claim 19, further comprising transmitting the control information of the access terminal over a first control block of the plurality of control blocks to the base station via a first antenna and over a second control block of the plurality of control blocks for transmission to the base station via a second antenna.

27. The method of claim 19, further comprising:
 transmitting the control information of the access terminal over the first plurality of control blocks to the base station node; and
 transmitting the control information of the access terminal to the base station over a third frequency range that is different from the first frequency range and the second frequency range during a second predetermined time interval, wherein the third frequency range is allocated to carry the first plurality of control blocks for transmitting only the control information, wherein duration of each of the first plurality of control blocks further spans over the entire duration of the second predetermined time interval.

28. The method of claim 19, further comprising transmitting the control information of the access terminal over the first plurality of control blocks for transmission to the base station node, wherein the first frequency range is allocated to further carry a second plurality of control blocks for transmitting control information of another communication apparatus that is in communication with the base station node, and wherein the other communication apparatus belongs to a set of communication devices conforming to operational requirements that predate operational requirements of the access terminal.

29. A method of communicating between an access terminal and a base station node, the method comprising:
 scheduling transmission of control information of the access terminal over a first frequency range and content data over a second frequency range during a first predetermined time interval, wherein the first frequency range is allocated to carry a first plurality of control blocks allocated contiguously over the first frequency range, for transmitting only the control information, wherein duration of each of the first plurality of control blocks spans over the entire duration of the first predetermined time interval; identifying a first control block of the first plurality of control blocks, wherein a plurality of portions of the control information are modulated using a plurality of different sequences comprising a plurality of orthogonal codes; and transmitting a schedule of the scheduled transmission from the base station node to the access terminal to direct transmission of at least a portion of the control information of the access terminal over the second frequency range, wherein the scheduled transmission further comprises a scheduled transmission of the modulated plurality of portions of the control information in the first control block of the first plurality of control blocks, and wherein the schedule further directs transmission of the control information of the access terminal over the first control block, wherein the plurality of sequences is configured to allow the base station node to uniquely identify the modulated plurality of portions of the control information from other control information transmitted concurrently to the base station node.

30. The method of claim 29, wherein a modulation format used to modulate the plurality of portions of the control information comprises a N point quadrature amplitude modulation (QAM) format, wherein N is greater than or equal to 8.

31. The method of claim 29, wherein the schedule further directs transmission of the control information of the access terminal over the first plurality of control blocks, and wherein the first frequency range comprises a contiguous frequency range.

32. The method of claim 29, wherein the schedule further directs transmission of the control information of the access terminal over the first plurality of control blocks, and further comprising:

scheduling transmission of control information and content data during a second predetermined time interval that is different than the first predetermined time interval, wherein the schedule further directs transmission of the control information over a second plurality of control blocks, and wherein duration of each of the second plurality of control blocks spans over the entire duration of the second predetermined time interval; and scheduling transmission of control information and content data during a third predetermined time interval that is different than the first predetermined time interval and the second predetermined time interval, wherein the schedule further directs transmission of the control information over a third plurality of control blocks, and wherein duration of each of the third plurality of control blocks spans over the entire duration of the third predetermined time interval.

33. The method of claim 29, wherein the first frequency range comprises a physical uplink control channel (PUCCH).

34. The method of claim 29, wherein the schedule further directs transmission of the content data of the access terminal over the second frequency range.

35. The method of claim 29, wherein the schedule further directs transmission of the control information of the access terminal over the first plurality of control blocks, and further comprising scheduling transmission of the control information over a third frequency range that is different from the first frequency range and the second frequency range during a second predetermined time interval, wherein the third frequency range is allocated to carry the first plurality of control blocks for transmitting only the control information, wherein duration of each of the first plurality of control blocks further spans over the entire duration of the second predetermined time interval.

36. The method of claim 29, wherein the schedule further directs transmission of the control information of the access terminal over the first plurality of control blocks, wherein the first frequency range is allocated to further carry a second plurality of control blocks for transmitting control information of another access terminal that is in communication with the base station node, and wherein the other access terminal belongs to a set of communication devices conforming to operational requirements that predate operational requirements of the access terminal.

37. A wireless communication apparatus operative in a communication network, the apparatus comprising:

means for transmitting control information over a first frequency range and content data over a second frequency range during a first predetermined time interval, wherein the first frequency range is allocated to carry a first plurality of control blocks allocated contiguously over the first frequency range, for transmitting only the control information, and wherein duration of each of the first plurality of control blocks spans over the entire duration of the first predetermined time interval;

means for identifying a first control block of the first plurality of control blocks;

means for modulating a plurality of portions of the control information using a plurality of different sequences and to send the modulated plurality of portions of the control information in the first control block of the first plurality of control blocks, wherein the plurality of sequences comprise a plurality of orthogonal codes; and means for directing at least a portion of the control information of the transmitting means over the second frequency range for transmission to a base station nodes wherein the plurality of sequences is configured to allow the base station node to uniquely identify the modulated plurality of portions of the control information from other control information transmitted concurrently to the base station node.

38. The apparatus of claim 37, wherein directing means is further configured to direct the control information of the transmitting means over the first plurality of control blocks for transmission to the base station node, and wherein the first frequency range comprises a contiguous frequency range.

39. The apparatus of claim 37, wherein the first frequency range comprises a physical uplink control channel (PUCCH).

40. The apparatus of claim 37, wherein the directing means is further configured to direct the control information of the transmitting means over the first plurality of control blocks for transmission to the base station node, wherein the first frequency range is allocated to further carry a second plurality of control blocks for transmitting control information of another communication apparatus that is in communication with the base station node, and wherein the other communication apparatus belongs to a set of communication devices conforming to operational requirements that predate operational requirements of the apparatus.

41. A wireless communication apparatus operative in a communication network, the apparatus comprising:

means for scheduling transmission of control information over a first frequency range and content data over a second frequency range during a first predetermined time interval, wherein the first frequency range is allocated to carry a first plurality of control blocks allocated contiguously over the first frequency range, for transmitting only the control information, wherein duration of each of the first plurality of control blocks spans over the entire duration of the first predetermined time interval; and means to identify a first control block of the first plurality of control blocks;

means for transmitting a schedule of the scheduled transmission to a first communication device to direct transmission of at least a portion of the control information of the first communication device over the second frequency range, wherein a plurality of portions of the control information are modulated using a plurality of different sequences comprising a plurality of orthogonal codes and the schedule comprises a scheduled transmission of the modulated plurality of portions of the control information in the first control block of the first plurality of control blocks, and wherein the schedule further directs transmission of the control information of the first communication device over the first control block, wherein the plurality of sequences is configured to allow the base station node to uniquely identify the modulated plurality of portions of the control information from other control information transmitted concurrently to the base station node.

42. The apparatus of claim 41, wherein the schedule further directs transmission of the control information of the first communication device over the first plurality of control blocks, and wherein the first frequency range comprises a contiguous frequency range.

43. The apparatus of claim 41, wherein the first frequency range comprises a physical uplink control channel (PUCCH).

44. The apparatus of claim 41, wherein the schedule further directs transmission of the control information of the first communication device over the first plurality of control blocks, wherein the first frequency range is allocated to further carry a second plurality of control blocks for transmitting control information of a second communication device that is in communication with the apparatus, and wherein the second communication device belongs to a set of communication devices conforming to operational requirements that predate operational requirements of the first communication device.

45. A non-transitory computer program product, comprising:
non-transitory computer-readable storage medium comprising:
code for causing a computer to identify a first frequency range for transmission of control information and a second frequency range for transmission of content data during a first predetermined time interval, wherein the first frequency range is allocated to carry a first plurality of control blocks allocated contiguously over the first frequency range, for transmitting only the control information, and wherein duration of each of the first plurality of control blocks spans over the entire duration of the first predetermined time interval;
code for identifying a first control block of the first plurality of control blocks;
code for causing a computer to modulate a plurality of portions of the control information using a plurality of different sequences comprising a plurality of orthogonal codes for transmission in the first control block of the first plurality of control blocks; and
code for causing a computer to transmit at least a portion of the control information of an access terminal over the second frequency range to a base station nodes wherein the plurality of sequences is configured to allow the base station node to uniquely identify the modulated plurality of portions of the control information from other control information transmitted concurrently to the base station node.

46. The non-transitory computer program product of claim 45, wherein the non-transitory computer-readable storage medium further comprises code for causing a computer to transmit the control information over the first plurality of control blocks to the base station node, wherein the first frequency range comprises a contiguous frequency range.

47. The non-transitory computer program product of claim 45, wherein the first frequency range comprises a physical uplink control channel (PUCCH).

48. The non-transitory computer program product of claim 45, wherein the non-transitory computer-readable storage medium further comprises code for causing a computer to transmit the control information of the access terminal over the first plurality of control blocks for transmission to the base station node, wherein the first frequency range is allocated to further carry a second plurality of control blocks for transmitting control information of another communication apparatus that is in communication with the base station node, and wherein the other communication apparatus belongs to a set of communication devices conforming to operational requirements that predate operational requirements of the access terminal.

49. A non-transitory computer program product, comprising:
non-transitory computer-readable storage medium comprising:
code for causing a computer to schedule transmission of control information of an access terminal over a first frequency range and content data over a second frequency range during a first predetermined time interval, wherein the first frequency range is allocated to carry a first plurality of control blocks allocated contiguously over the first frequency range, for transmitting only the control information, wherein duration of each of the first plurality of control blocks spans over the entire duration of the first predetermined time interval, wherein a plurality of portions of the control information are modulated using a plurality of different sequences comprising a plurality of orthogonal codes, and wherein the code for causing the computer to schedule transmission of the control information further comprises code for causing the computer to schedule transmission of the modulated plurality of portions of the control information in the first control block of the first plurality of control blocks, and wherein the schedule further directs transmission of the control information of the access terminal over the first control block; and
code for causing a computer to transmit a schedule of the scheduled transmission to the access terminal to direct transmission of at least a portion of the control information of the access terminal over the second frequency range, wherein the plurality of sequences is configured to allow the base station node to uniquely identify the modulated plurality of portions of the control information from other control information transmitted concurrently to the base station node.

50. The non-transitory computer program product of claim 49, wherein the schedule further directs transmission of the control information of the access terminal over the first plurality of control blocks, and wherein the first frequency range comprises a contiguous frequency range.

51. The non-transitory computer program product of claim 49, wherein the first frequency range comprises a physical uplink control channel (PUCCH).

52. The non-transitory computer program product of claim 49, wherein the schedule further directs transmission of the control information of the access terminal over the first plurality of control blocks, wherein the first frequency range is allocated to further carry a second plurality of control blocks for transmitting control information of another access terminal that is in communication with a base station node, and wherein the other access terminal belongs to a set of communication devices conforming to operational requirements that predate operational requirements of the access terminal.

* * * * *